(12) United States Patent
Fernandez et al.

(10) Patent No.: US 12,235,342 B2
(45) Date of Patent: Feb. 25, 2025

(54) METHOD, ELECTRONIC DEVICE, AND COMPUTER PROGRAM PRODUCT FOR MONITORING AUTHENTICATION BASED ON RADAR

(71) Applicant: Dell Products L.P., Round Rock, TX (US)

(72) Inventors: Pedro Fernandez, Shanghai (CN); Qiang Chen, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 371 days.

(21) Appl. No.: 17/984,886

(22) Filed: Nov. 10, 2022

(65) Prior Publication Data

US 2024/0134026 A1 Apr. 25, 2024
US 2024/0230873 A9 Jul. 11, 2024

(30) Foreign Application Priority Data

Oct. 21, 2022 (CN) .......................... 202211294946.4

(51) Int. Cl.
*G01S 13/44* (2006.01)
*G01S 7/41* (2006.01)
(Continued)

(52) U.S. Cl.
CPC .......... *G01S 13/4427* (2013.01); *G01S 13/18* (2013.01); *G01S 13/449* (2013.01); *G06F 21/44* (2013.01); *G01S 7/417* (2013.01)

(58) Field of Classification Search
CPC ..... G01S 13/4427; G01S 13/18; G01S 13/449
See application file for complete search history.

(56) References Cited

U.S. PATENT DOCUMENTS 9,189,901 B2 * 11/2015 Agrafioti ................ G06F 21/83
10,836,256 B2 * 11/2020 Greenberg ............ B60K 35/10
(Continued)

OTHER PUBLICATIONS

Nosrati, M., Shahsavari, S., Lee, S., Wang, H., and Tavassolian, N., "A Concurrent Dual-Beam Phased Array Doppler Radar Using MIMO Beamforming Techniques for Short-Range Vital-Signs Monitoring", 2019, IEEE, vol. 67, No. 4, pp. 2390-2404 (Year: 2019).*

(Continued)

*Primary Examiner* — Joshua L Schwartz
*Assistant Examiner* — Kimberly Jenkins
(74) *Attorney, Agent, or Firm* — Ryan, Mason & Lewis, LLP

(57) ABSTRACT

A method in an illustrative embodiment includes determining that a first object authenticated by an electronic device is accessing the electronic device. The method further includes, in response to a second object being detected within a detection range using a radar of the electronic device, determining, based on a detected signal, that the second object is a person. The method further includes determining a distance and an angle between the second object and the electronic device based on an azimuth signal in the detected signal. The method further includes in response to determining that the distance is less than a distance threshold and the angle is less than an angle threshold, determining, based on the biological feature signal, whether the second object is trustworthy. The method further includes deauthenticating the first object in response to determining that the second object is untrustworthy.

20 Claims, 7 Drawing Sheets

(51) Int. Cl.
*G01S 13/18* (2006.01)
*G06F 21/44* (2013.01)

(56) References Cited

U.S. PATENT DOCUMENTS

| | | | |
|---|---|---|---|
| 11,170,085 B2* | 11/2021 | Devine | G06F 21/316 |
| 2015/0081210 A1* | 3/2015 | Yeh | A61B 5/02055 |
| | | | 701/428 |
| 2017/0245106 A1* | 8/2017 | Connelly | H04W 72/51 |
| 2020/0236545 A1* | 7/2020 | Xu | A61B 5/1135 |
| 2021/0064144 A1* | 3/2021 | Stern | G06F 3/0487 |
| 2023/0341518 A1* | 10/2023 | Rajab | A61B 5/1118 |

OTHER PUBLICATIONS

Wikipedia, "Radar," https://en.wikipedia.org/wiki/Radar, Nov. 10, 2022, 29 pages.

M. Belfiore, "Experimental Radar Technology Monitors Vital Signs without Contact," https://www.dell.com/nl-nl/perspectives/experimental-radar-technology-monitors-vital-signs-without-contact/, May 11, 2022, 3 pages.

* cited by examiner

600

610 — Trusted list

| Name | Detected signal profile | Number of times of detections | Duration of stay |
|---|---|---|---|
| B1 |  | 37 | 30min |
| H2 |  | 32 | 10min |
| C2 |  | 3 | 0.4min |
| D4 |  | 50 | 20min |
| B7 |  | 55 | 31min |
| T1 |  | 79 | 35min |

620 — Untrusted list

| Name | Detected signal profile | Number of times of detections | Duration of stay |
|---|---|---|---|
| B3 |  | 1 | 0.1min |
| H5 |  | 3 | 0.3min |
| C7 |  | 2 | 0.3min |

630 — To-be-confirmed list

| Name | Detected signal profile | Number of times of detections | Duration of stay |
|---|---|---|---|
| T3 |  | 1 | 0.1min |
| Q1 |  | 1 | 0.1min |
| G4 |  | 1 | 0.1min |

FIG. 6

METHOD, ELECTRONIC DEVICE, AND COMPUTER PROGRAM PRODUCT FOR MONITORING AUTHENTICATION BASED ON RADAR

RELATED APPLICATION

The present application claims priority to Chinese Patent Application No. 202211294946.4, filed Oct. 21, 2022, and entitled "Method, Electronic Device, and Computer Program Product for Monitoring Authentication Based on Radar," which is incorporated by reference herein in its entirety.

FIELD

Embodiments of the present disclosure relate to the field of electronic devices and, more particularly, to a method, an electronic device, and a computer program product for monitoring authentication based on a radar.

BACKGROUND

In the past few years, radar has been used in a variety of electronic devices as an affordable substitute for other sensor technologies. Unlike other sensors, a radar sensor is not affected by light or darkness, and has the ability to detect obstacles such as glass. Compared with other sensor technologies (such as an ultrasonic sensor technology), the radar has a longer sensing distance and is safe to people and animals. In addition, some attractive uses of a radar include presence detection, position detection, person counting, wall crossing detection, speed measurement, and recently widely used biological recognition.

SUMMARY

Embodiments of the present disclosure provide techniques for monitoring authentication by recognizing users and other people around those users based on a radar.

In a first aspect of the present disclosure, a method for monitoring authentication based on a radar is provided. The method includes determining that a first object authenticated by an electronic device is accessing the electronic device. The method further includes, in response to a second object being detected within a detection range using a radar apparatus of the electronic device, determining, based on a detected signal, that the second object is a person. The method further includes determining a distance and an angle between the second object and the electronic device based on an azimuth signal in the detected signal. The method further includes in response to determining that the distance is less than a first distance threshold and the angle is less than an angle threshold, determining, based on a biological feature signal, whether the second object is trustworthy. The method further includes deauthenticating the first object in response to determining that the second object is untrustworthy.

In a second aspect of the present disclosure, an electronic device is provided. The electronic device includes a radar apparatus, a processor, and a memory coupled to the processor. The memory has instructions stored therein, and the instructions, when executed by the processor, cause the electronic device to execute actions. The actions include: determining that a first object authenticated by an electronic device is accessing the electronic device. The actions further include, in response to a second object being detected within a detection range using the radar apparatus, determining, based on a detected signal, that the second object is a person. The actions further include determining a distance and an angle between the second object and the electronic device based on an azimuth signal in the detected signal. The actions further include in response to determining that the distance is less than a first distance threshold and the angle is less than an angle threshold, determining, based on a biological feature signal, whether the second object is trustworthy. The actions further include deauthenticating the first object in response to determining that the second object is untrustworthy.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the accompanying drawings:

FIG. 6 illustrates a schematic diagram of a feature library according to an embodiment of the present disclosure.

DETAILED DESCRIPTION

Figure 1:
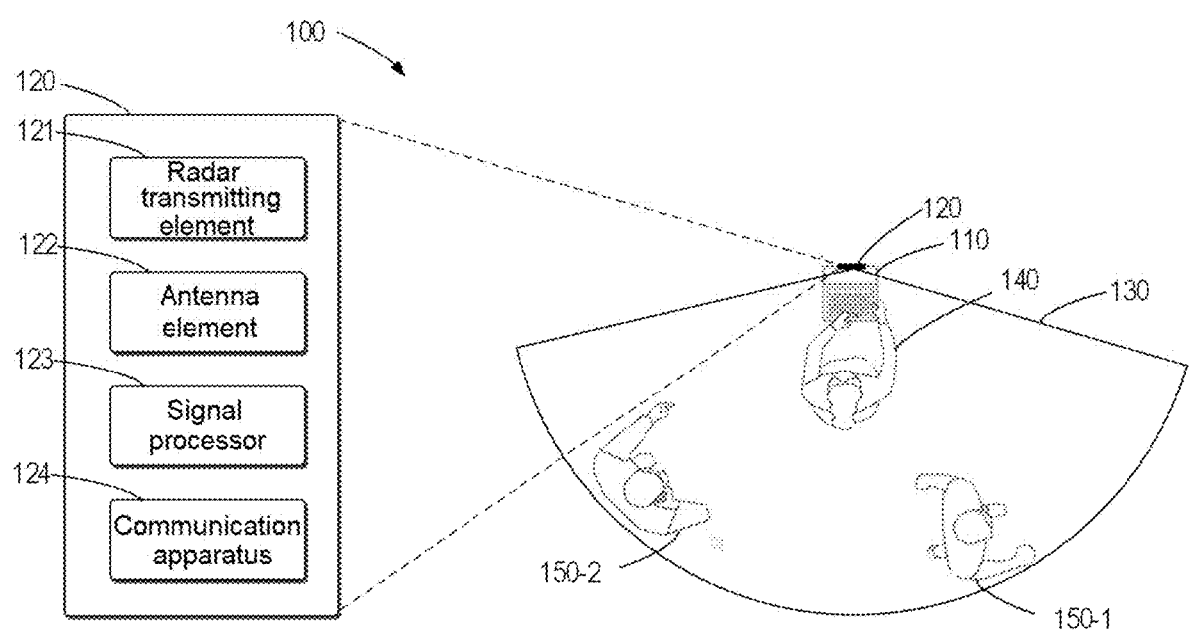
FIG. 1 illustrates a schematic diagram of an example environment in which embodiments of the present disclosure may be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, a radar technology can not only detect a direction and position of an object within a detection range, but also carry out biological recognition by means of detecting biometric features of biological objects. For example, a millimeter wave (mmWave) radar will emit electromagnetic waves, and any object in its path will reflect a signal back. By capturing and processing a reflected signal, a radar system can determine a distance, speed, and angle of the object. Since it can provide a millimeter-level accuracy in object distance detection, the mmWave radar becomes an ideal sensing technology for human biological signals. The mmWave radar can be used for monitoring vital signs, such as a breathing rate (BR) and a heart rate (HR). Because of differences between human beings, biological features of human beings can be determined through the vital signs for recognition and authentication.

In general, a biological recognition function of the radar has been used for authentication for some electronic devices. However, these authentications are very simple. Therefore, it is desired to provide more security functions by using the biological recognition function of the radar.

An embodiment of the present disclosure provides a solution for monitoring authentication based on a radar to solve one or more of the above problems and other potential problems. In this solution, when it is confirmed that an authenticated user is accessing an electronic device, a radar is used for detecting other people around the authenticated user. If it is detected that other people are too close and can see a display apparatus of the electronic device, the user is deauthenticated. For example, the display apparatus returns to an authentication interface to prevent other people from seeing contents displayed on the electronic device. In this way, it is possible to determine whether other people are trustworthy through the high-precision identification capability of the radar, thus avoiding other untrustworthy people from seeing the contents displayed on the electronic device, and improving the security of the user's access.

FIG. 1 illustrates a schematic diagram of example environment 100 in which embodiments of the present disclosure may be implemented. As described in FIG. 1, radar apparatus 120 is installed on electronic device 110. User 140 is accessing the display apparatus of electronic device 110. User 140 may be viewed as an example of what is more generally referred to herein as a "first object." User 140 is authenticated through, for example, a biological feature detected by radar apparatus 120. Radar apparatus 120 transmits a radar field and forms detection range 130. Radar apparatus 120 can detect positions of all objects within detection range 130, and can detect biological signals of biological objects in detection range 130. For example, in the example shown in FIG. 1, radar apparatus 120 can detect person 150-1 and person 150-2 in detection range 130. A given one of the persons 150 may be viewed as an example of what is more generally referred to herein as a "second object."

Electronic device 110 may include, for example, a laptop computer, a television, a smart phone, a tablet computer, and a desktop computer, but can also use other devices such as a home automation and control system, an entertainment system, an audio system, a home appliance, a security system, a netbook, and an electronic reader. Electronic device 110 may be wearable or non-wearable, but mobile or relatively immobile (for example, a desktop computer and an entertainment system), and the present disclosure is not intended to limit this.

An example structure of radar apparatus 120 is shown in FIG. 1. Radar apparatus 120 may be a part of electronic device 110, or radar apparatus 120 may be separate from electronic device 110.

Radar apparatus 120 includes radar transmitting element 121, antenna element 122, signal processor 123, and communication apparatus 124. Generally, radar transmitting element 121 provides a radar field. For example, the radar field may be configured to be reflected from a fabric (such as clothing). The radar field can also be configured to penetrate through fabrics or other obstacles and be reflected from human skins or tissues. These fabrics or obstacles may include wood, glass, plastic, cotton, wool, nylon, and similar fibers, and the radar field is reflected from human tissues (such as human faces).

The provided radar field may be a wide field, a narrow field, a surface field, a volume field, a shaping field (for example, a hemisphere, a cube, a sector, a cone, or a column), a steering field, a non-steering field, a short range (near) field, a medium range field, or a long range field. Therefore, the radar field provided by radar transmitting element 121 may be of a small size, such as about one millimeter to 1.5 meters, or may be of a medium size, such as about one to 30 meters. It should be understood that these sizes are only illustrative, and any other suitable sizes or ranges of the radar field may be used.

Radar transmitting element 121 may also use a continuous wave signal or a pulsed Doppler signal, and use various frequencies, update rates, pulse widths, interpulse periods (IPPs), transmitting power, and modulation. For example, radar transmitting element 121 may transmit continuously modulated radiation, ultra-wideband radiation, or sub-millimeter frequency radiation. In some embodiments, radar transmitting element 121 may form radiation in beams. The beams can help antenna element 122 and signal processor 123 to determine which of these beams are interrupted, and thus determine specific objects or interaction positions within the radar field.

Antenna element 122 can receive reflections from objects in the radar field or sense objects in the radar field. In some embodiments, the reflections include reflections from human tissues (such as a person's face or body) in the radar field or from movements of a person's head, legs, arms, hands, or torso. In addition, the reflections may also include reflections from clothing or other materials worn by the persons in the radar field.

Signal processor 123 can process the reflections received within the radar field to provide authentication data associated with the received reflections. The authentication data is data based on radar reflection, which can be used for determining whether an object in the radar field is a person, and in some implementations, for determining whether the person is a specific person who can access electronic device 110 (for example, to authenticate the person as an authorized user). In some embodiments, antenna element 122 may receive reflections from a plurality of human tissue targets in the radar field, and signal processor 123 is configured to process the received interactions sufficient to distinguish one of the plurality of human tissue targets from another of the plurality of human tissue targets. These targets may include the faces, heads, torsos, hands, arms, and legs from the same person or from different persons. As such, many different persons can be distinguished from one another.

Communication apparatus 124 may include a bus or a remote signal transceiver. Thus, radar apparatus 120 can be used as a part of electronic device 110 or as a wireless peripheral. The solution for monitoring authentication based on a radar according to the present disclosure will be described in detail below with reference to FIG. 2 to FIG. 6.

Figure 2:
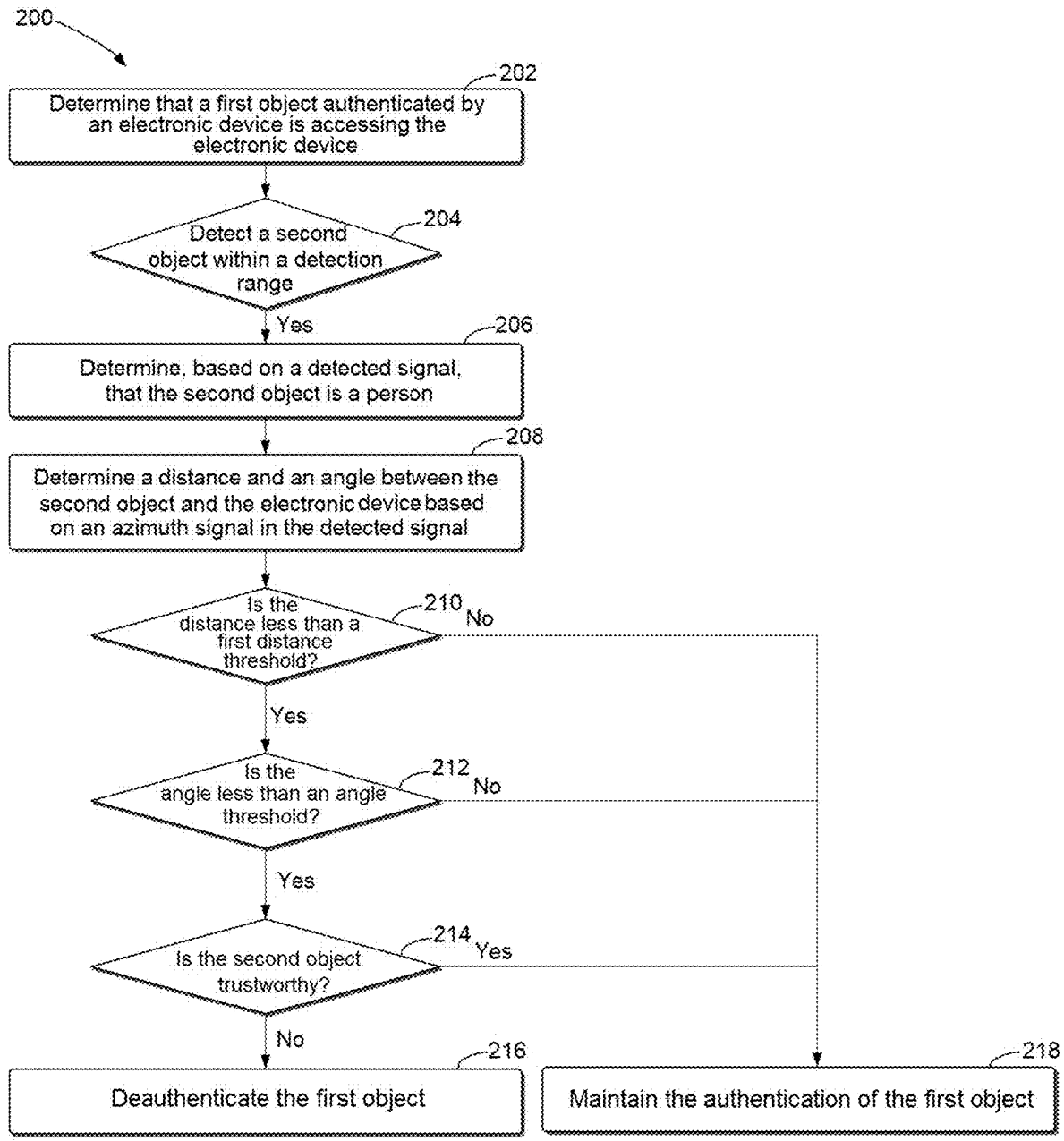
FIG. 2 illustrates a flow chart of an example method for monitoring authentication based on a radar according to an embodiment of the present disclosure.

FIG. 2 illustrates a flow chart of example method 200 for monitoring authentication based on a radar according to an embodiment of the present disclosure. Method 200 may be performed by, for example, electronic device 110 in FIG. 1.

At 202, electronic device 110 determines that a first object authenticated by the electronic device is accessing the electronic device. After the first object, e.g., the current user 140 of electronic device 110, has been authenticated, electronic device 110 is unlocked, so that the first object can access and operate electronic device 110. At this time, in order to avoid operation contents of the user from being seen by other people that may be untrustworthy, electronic device 110 enables an authentication monitoring function to perform deauthentication when there is a risk of leakage. The authentication monitoring function can be enabled in response to the electronic device being unlocked after the user's authentication succeeds, or it can be manually enabled or disabled by the user.

At 204, electronic device 110 determines whether a second object is detected within a detection range using a radar apparatus of electronic device 110. If a second object is detected, method 200 proceeds to 206. If no second object is detected, electronic device 110 will continue to detect a second object, for example, performing periodic detection.

At 206, electronic device 110 determines, based on a detected signal, that the second object is a person. After the authentication monitoring function is enabled, the radar apparatus (for example, radar apparatus 120 in FIG. 1) of electronic device 110 provides a radar field and forms a certain detection range. Radar apparatus 120 detects a detected signal of an object by receiving a signal reflected by the object within the detection range. The detected signal may include a biological feature signal (such as a breathing rate signal and a heart rate signal of the object), and can also include an azimuth signal and other signals reflected from various parts of the object's body. When receiving the signal, electronic device 110 can determine, according to the signal, whether the object is a person. For example, the reflections from the object may be compared with stored reference data, and whether the object is a person can be determined based on a comparison result. For example, the stored reference data may include a radar reflection profile of an exemplary human body, which may be used for distinguishing reflections from a person from reflections from other objects. The stored reference data may also include user specific radar reflection profiles that can be used for identifying and distinguishing different persons.

At 208, electronic device 110 determines a distance and an angle between the second object and electronic device 110 based on an azimuth signal in the detected signal. When a person within the detection range is detected, a relative position and a relative angle of the second object relative to electronic device 110 are detected from the azimuth signal. Thus, it can be determined whether the second object can see the display apparatus of electronic device 110. Relative position relationships between various objects and electronic device 110 in this application scenario will be described below with reference to FIG. 3.

Figure 3:
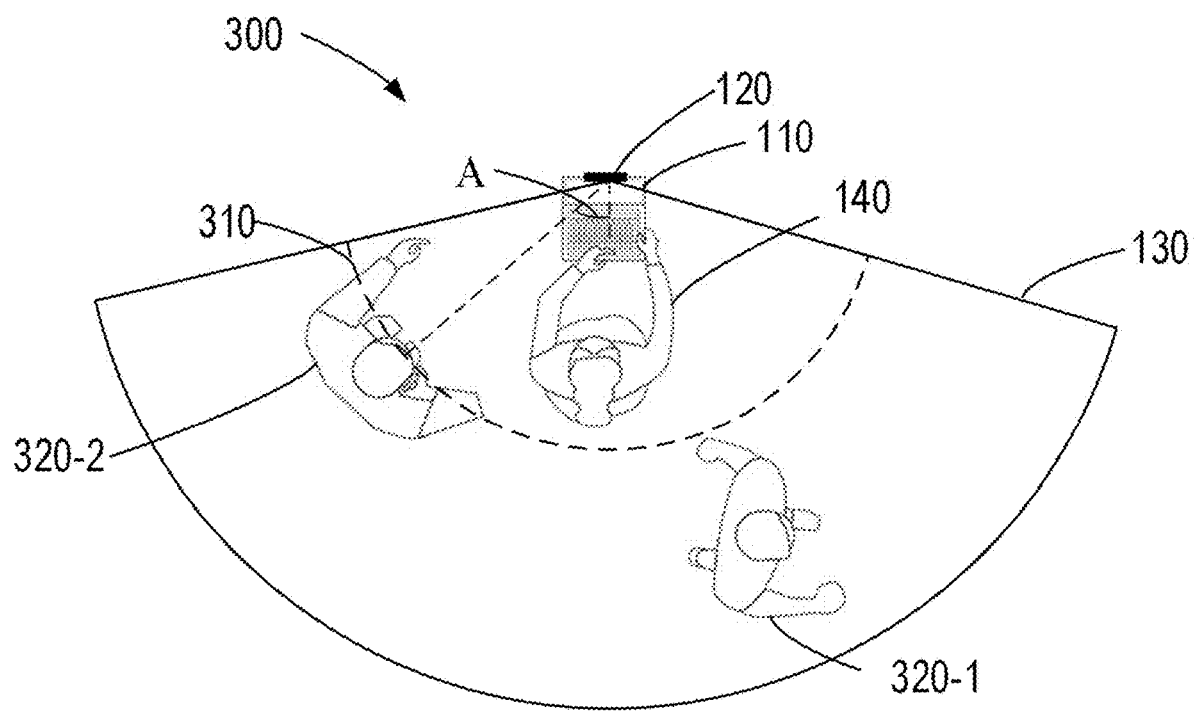
FIG. 3 illustrates a schematic diagram of an example scenario for monitoring authentication based on a radar according to an embodiment of the present disclosure.

FIG. 3 illustrates a schematic diagram of example scenario 300 for monitoring authentication based on a radar according to an embodiment of the present disclosure. As shown in FIG. 3, user 140 (also referred to herein as "a first object") is accessing electronic device 110. At this time, radar apparatus 120 of electronic device 110 detects that there are also second object 320-1 passing behind user 140 and second object 320-2 (second object 320-2 and second object 320-1 are collectively referred to as second object 320) close to user 140 within its detection range 130. First threshold range 310 corresponding to a first distance threshold is also configured within detection range 130. When second object 320 enters first threshold range 310, it is considered that second object 320 can see the display apparatus of electronic device 110 in an appropriate direction. According to an azimuth signal in a detected signal for second object 320-2, it is detected that second object 320-2 has entered first threshold range 310, and angle A of second object 320-2 from a normal of the display apparatus of electronic device 110 is determined. According to a light emission range of a screen of electronic device 110, second object 320-2 has a better viewing angle if angle A is smaller. Correspondingly, electronic device 110 also detects that second object 320-1 is not within first threshold range 310 and is far from first threshold range 310. Therefore, it can be determined that second object 320-1 does not pose a risk.

Returning to FIG. 2, after the distance and the angle between second object 320 and electronic device 110 are determined, whether there is a risk of leaking displayed contents to second object 320 will be determined. At 210, electronic device 110 determines whether the determined distance is less than a first distance threshold. As discussed above, when the distance between second object 320 and electronic device 110 is less than the first distance threshold, it is considered that second object 320 can see electronic device 110, and method 200 proceeds to 212. If the distance is not less than the first distance threshold, the method proceeds to 218.

At 212, electronic device 110 determines whether the determined angle is less than an angle threshold. If the determined angle is less than the angle threshold value, it means that second object 320 faces to electronic device 110, and can see the displayed contents on electronic device 110. Method 200 proceeds to 214. If the angle is not less than the angle threshold, the method proceeds to 218. At 214, electronic device 110 determines, based on a biological feature signal in the detected signal, whether second object 320 is trustworthy.

In some implementations, biological recognition may be performed using a radar-based heartbeat pattern recognition technology or a radar-based respiratory pattern recognition technology. For example, the radar-based respiratory pattern recognition technology can use stored information of respiratory patterns (or other biometric features, such as a heart profile) of detected historical objects, and use the stored respiratory patterns to recognize objects. In some embodiments, a biological feature may be a biometric feature of a person, such as a person's height, the size or length of a particular body part or bone (for example, from the tibia to the thigh, or from the upper arm to the lower arm), an arm or leg length, a hip width, or a shoulder width ratio.

In some embodiments, electronic device 110 may determine a biological feature of the second object based on the biological feature signal of the second object. Then, the determined biological feature is compared with reference biological features in a feature library. The second object is labeled as trustworthy if the determined biological feature is matched with a reference biological feature in a trusted list in the feature library. The second object is labeled as untrustworthy if the biological feature is not matched with any reference biological feature in the trusted list in the feature library. Later, the feature library will be described in detail with reference to FIG. 6.

If second object 320 is determined to be untrustworthy, the method proceeds to 216. At 216, electronic device 110 deauthenticates the first object. For example, after the deauthentication of the first object, electronic device 110 is in a logout state. At this time, the user can return to the authentication interface or darken the screen. In some implementations, radar apparatus 120 may prompt the user and ask whether electronic device 110 should be locked (for example, via a voice or an on-screen prompt). Alternatively, when second object 320 leaves the first threshold range of electronic device 110, electronic device 110 may automatically re-authenticate the first object, that is, user 140.

In this way, by means of recognizing whether the second object can see the displayed contents and is trustworthy and performing corresponding operations on the authentication according to corresponding determining results, it can be ensured that the displayed contents on electronic device 110 are not leaked to an untrustworthy object, thereby improving the confidentiality of user access and operations.

In contrast, at 218, electronic device 110 maintains the authentication of the first object based on the determination results. In this way, it can be ensured that the normal access of the user will not be interrupted, thus ensuring the user experience.

The biological feature detection function based on radar apparatus 120 can not only achieve biological recognition, but also determine the mood of the user of electronic device 110 according to the detected biological feature. The solution for monitoring mood based on a radar will be described in detail below with reference to FIG. 4 to FIG. 5.

Figure 4:
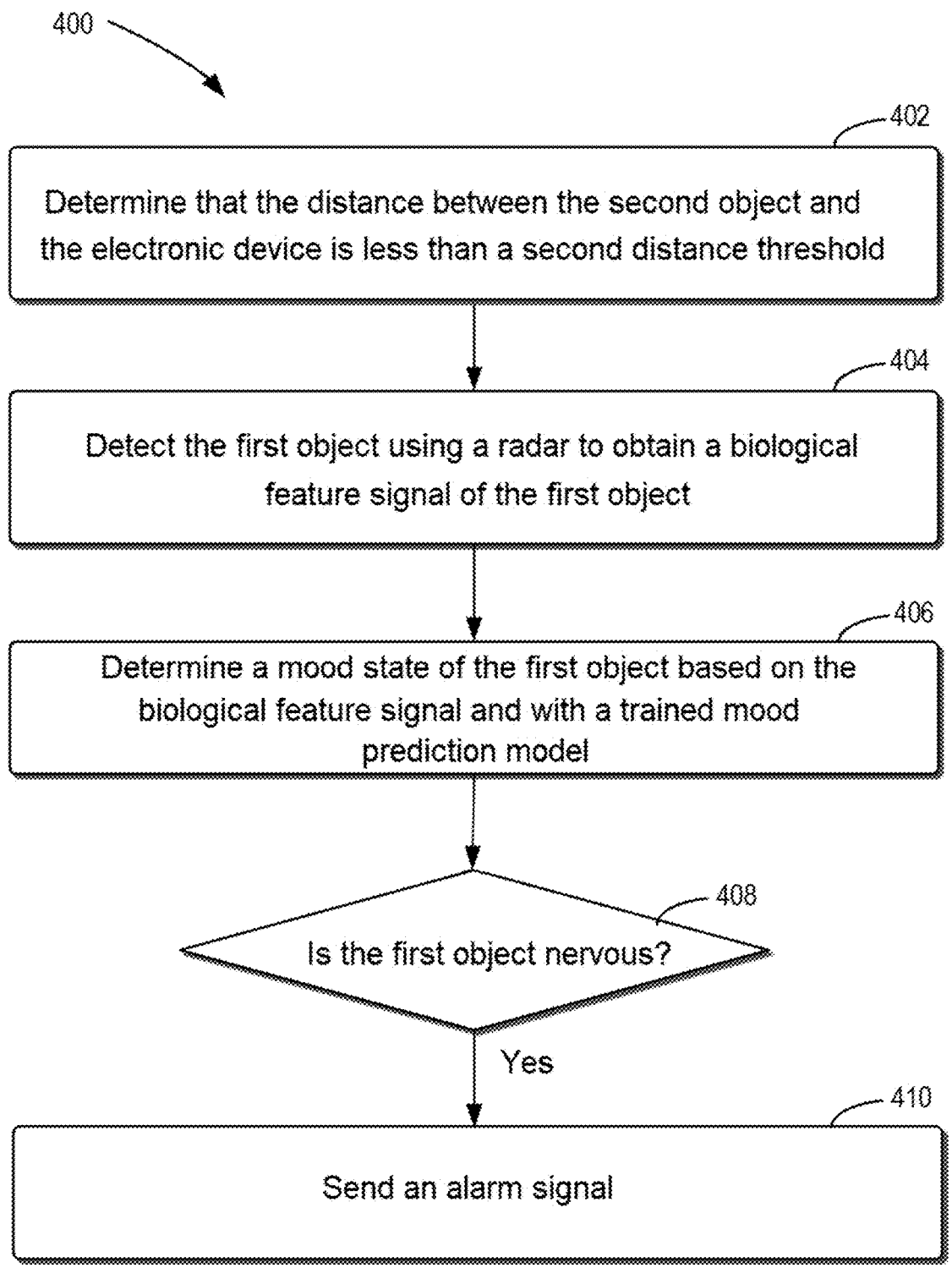
FIG. 4 is a flow chart of an example method for monitoring mood based on a radar according to an embodiment of the present disclosure.

FIG. 4 is a flow chart of example method 400 for monitoring mood based on a radar according to an embodiment of the present disclosure. Method 400 may be performed by, for example, electronic device 110 in FIG. 1.

At 402, electronic device 110 determines that the distance between the second object and electronic device 110 is less than a second distance threshold. Relative position relationships between various objects and electronic device 110 in this application scenario will be described below with reference to FIG. 5.

Figure 5:
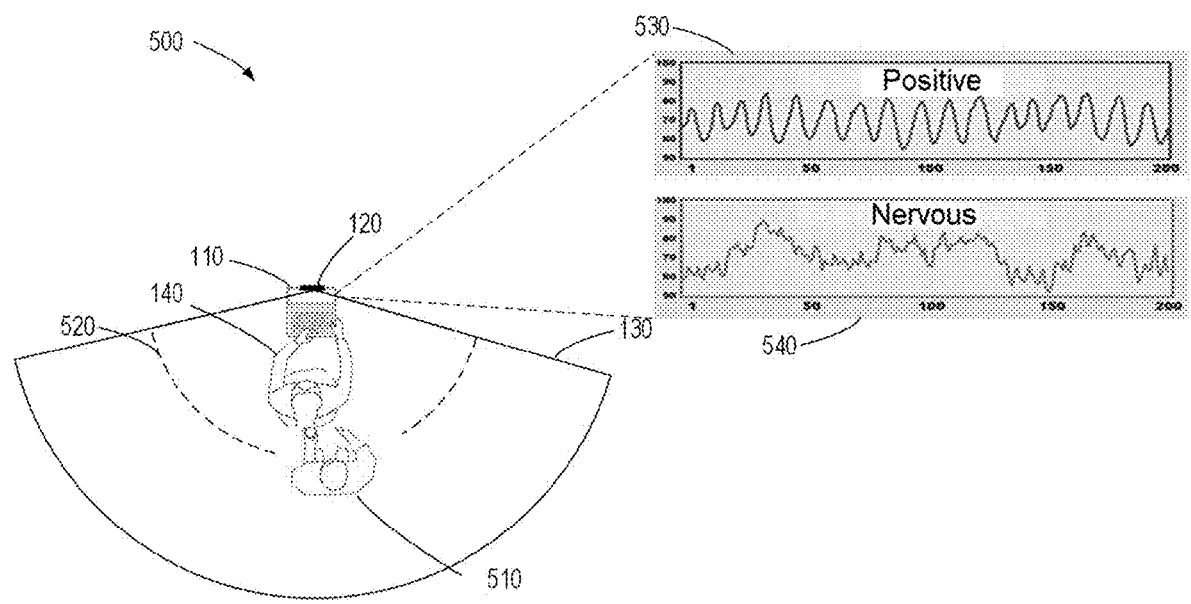
FIG. 5 illustrates a schematic diagram of an example scenario for monitoring mood based on a radar according to an embodiment of the present disclosure.

FIG. 5 illustrates a schematic diagram of example scenario 500 for monitoring mood based on a radar according to an embodiment of the present disclosure. As shown in FIG. 5, user 140 is accessing electronic device 110. At this time, radar apparatus 120 of electronic device 110 detects that there is also second object 510 behind user 140 within its detection range 130. Second threshold range 520 corresponding to the second distance threshold is also configured within detection range 130. When second object 510 enters second threshold range 520, it is considered that second object 510 is too close to electronic device 110 and user 140. In the embodiment shown in FIG. 5, it is detected, according to an azimuth signal in a detected signal for second object 510, that second object 510 has entered second threshold range 520.

Returning to FIG. 4, at 404, electronic device 110 detects the first object using a radar to obtain a biological feature signal of user 140. In some embodiments, the biological feature signal is, for example, a signal of a biological feature related to the mood, for example, a heart rate and a breathing rate.

At 406, electronic device 110 determines a mood state of user 140 based on the biological feature signal and with a trained mood prediction model. The mood prediction model can determine, based on a pattern of the biological feature signal, a mood state corresponding to the pattern. An elevated heartbeat or a sharp change to a respiratory pattern/heartbeat can be a sign of a stress response and other mood states. Therefore, the mood prediction model can predict the mood of the first object through training.

At 408, electronic device 110 determines whether the mood state of user 140 is a nervous state. When electronic device 110 acquires a current biological feature signal of user 140, electronic device 110 can determine the mood state of user 140 based on a difference between the current biological feature signal and a stored biological feature signal. Referring to FIG. 5 again, electronic device 110 stores biological feature signals, i.e., heart rate chart 530, of user 140 when the mood state is positive. The current biological feature signal acquired by electronic device 110 is heart rate chart 540. By the difference between heart rate chart 540 and heart rate chart 530, electronic device 110 can determine that heart rate chart 540 indicates that user 140 feels nervous. Therefore, it can be determined that user 140 currently feels nervous. At this time, it can be considered that user 140 may be threatened by second object 510.

If user 140 is nervous, method 400 proceeds to 410. If user 140 is not nervous, the method ends. At 410, electronic device 110 sends an alarm signal. For example, electronic device 110 makes sounds to broadcast around that user 140 is threatened. In addition, electronic device 110 can also deauthenticate user 140 and lock electronic device 110. Alternatively, electronic device 110 may send a distress signal to other electronic devices.

In this way, when other persons are too close to the user, the current mood of the user can be determined through the detected biological feature signal, and the electronic device can recognize that the user is under a threat and take corresponding measures, thus improving the safety of the user.

FIG. 6 illustrates a schematic diagram of feature library 600 according to an embodiment of the present disclosure. In some embodiments, feature library 600 is established in electronic device 110. Feature library 600 stores detected signals of all detected objects. For example, when electronic device 110 receives a detected signal of a detected object from radar apparatus 120, electronic device 110 sets a random name for the detected signal for recognition, and stores the detected signal in the form of a profile. In addition, other information is recorded in feature library 600, such as the number of times of detections and a duration of stay in a predetermined range as shown in FIG. 6. The number of times of detections and the duration of stay can reflect a relationship between the detected person and the user who is accessing electronic device 110 to a certain extent.

Trusted list 610, untrusted list 620, and to-be-confirmed list 630 are established in feature library 600. When detecting an object for the first time, electronic device 110 will put the object into to-be-confirmed list 630 for subsequent placement in trusted list 610 or in untrusted list 620. Trusted list 610 includes all objects labeled as trustworthy. For example, an object that has been detected for a large number of times or stayed for a long time can be considered to be closely related to the user and trusted by the user, and therefore put in trusted list 610. In some embodiments, when user 140 is being authenticated, there is a second object in proximity. This shows that the first object allows the second object to see the displayed contents on electronic device 110. Therefore, the second object is automatically put in the trusted list, for example, object C2 in FIG. 6. Untrusted list 620 includes all objects labeled as untrustworthy. In some embodiments, when electronic device 110 detects an object in untrusted list 620, electronic device 110 can take more stringent protection measures.

In this way, more information can be provided for the authentication monitoring or mood monitoring function by means of preventing and maintaining all the objects detected within detection range 130 of radar apparatus 120, which is conducive to the implementation of the two functions.

Figure 7:
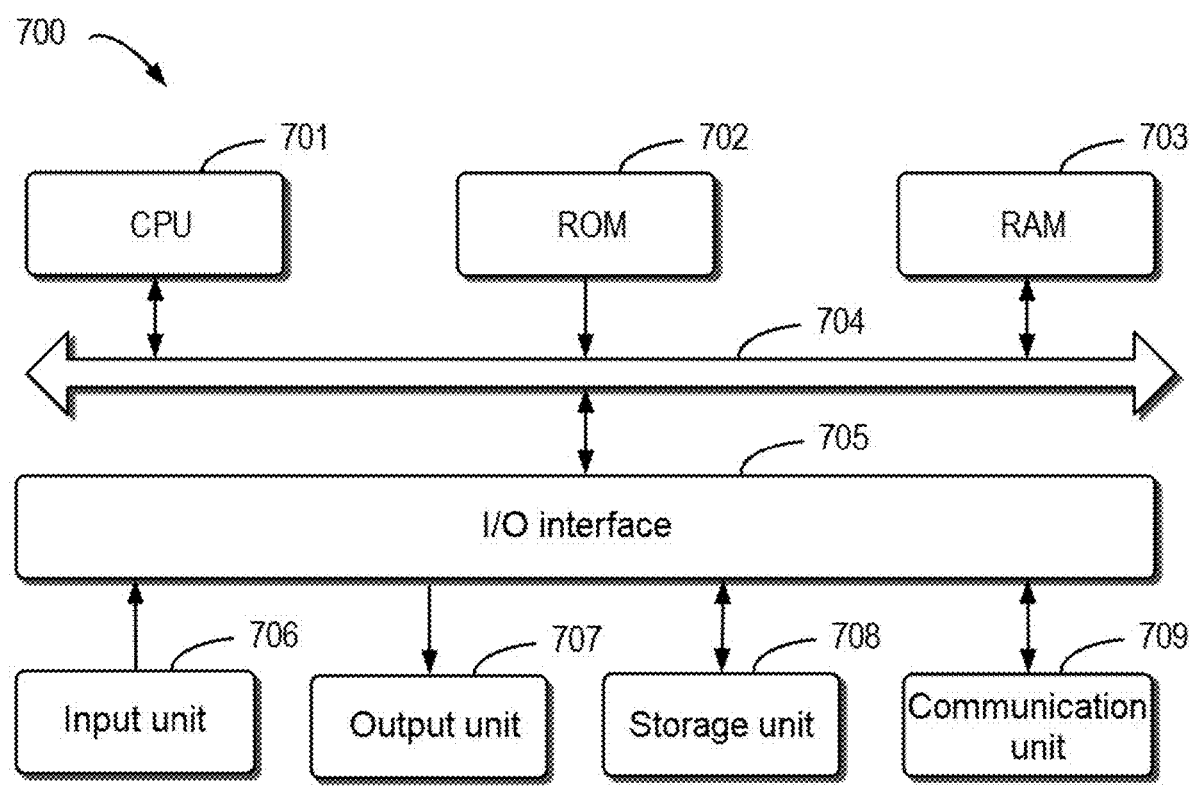
FIG. 7 illustrates a block diagram of an example device that may be configured to implement embodiments of the present disclosure.

FIG. 7 illustrates a schematic block diagram of example device 700 that may be used to implement embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods and processes described above, such as methods 200 and 400, may be performed by CPU 701. For example, in some embodiments, methods 200 and 400 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more steps of methods 200 and 400 described above can be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method comprising:
   determining that a first object authenticated by an electronic device is accessing the electronic device;
   in response to a second object being detected within a detection range using a radar apparatus of the electronic device, determining, based on a detected signal, that the second object is a person;
   determining a distance and an angle between the second object and the electronic device based on an azimuth signal in the detected signal;
   in response to determining that the distance is less than a first distance threshold and the angle is less than an angle threshold, determining, based on a biological feature signal in the detected signal, whether the second object is trustworthy; and
   deauthenticating the first object in response to determining that the second object is untrustworthy.

2. The method according to claim 1, further comprising:
   detecting the second object in response to an authentication request from the first object being received; and
   labeling the second object as trustworthy in response to the second object being detected.

3. The method according to claim 1, further comprising:
   maintaining the authentication of the first object in response to determining at least one of the following:
   the distance is greater than the first distance threshold, or the angle is greater than the angle threshold.

4. The method according to claim 1, wherein the determining whether the second object is trustworthy comprises:
   determining a biological feature of the second object based on the biological feature signal;
   comparing the biological feature with reference biological features in a feature library;
   labeling the second object as trustworthy in response to determining that the biological feature is matched with a reference biological feature in a trusted list in the feature library; and
   labeling the second object as untrustworthy in response to determining that the biological feature is not matched with any reference biological feature in the trusted list in the feature library.

5. The method according to claim 4, further comprising:
   establishing the feature library, the feature library comprising biological features of all detected objects; and
   establishing the trusted list in the feature library, the trusted list comprising objects, among all the objects, whose distances are less than the first distance threshold and angles are less than the angle threshold during the authentication of the first object.

6. The method according to claim 1, further comprising:
   detecting the first object using the radar apparatus to obtain a biological feature signal of the first object; and
   determining a mood state of the first object based on the biological feature signal and with a trained mood prediction model, wherein the mood prediction model is configured to determine, based on a pattern of the biological feature signal, a mood state corresponding to the pattern.

7. The method according to claim 6, further comprising:
   determining a mood state of the first object based on the biological feature signal in response to determining that the distance is less than a second distance threshold; and
   sending an alarm signal in response to the mood state being a nervous state.

8. The method according to claim 1, wherein the biological feature signal comprises at least one of the following items: a heartbeat signal and a respiration signal.

9. An electronic device, comprising:
   a radar apparatus;
   a processor; and a memory coupled to the processor, wherein the memory has instructions stored therein which, when executed by the processor, cause the electronic device to execute actions comprising:

determining that a first object authenticated by an electronic device is accessing the electronic device;

in response to a second object being detected within a detection range using the radar apparatus, determining, based on a detected signal, that the second object is a person;

determining a distance and an angle between the second object and the electronic device based on an azimuth signal in the detected signal;

in response to determining that the distance is less than a first distance threshold and the angle is less than an angle threshold, determining, based on a biological feature signal in the detected signal, whether the second object is trustworthy; and deauthenticating the first object in response to determining that the second object is untrustworthy.

10. The electronic device according to claim 9, wherein the actions further comprise:

detecting the second object in response to an authentication request from the first object being received; and labeling the second object as trustworthy in response to the second object being detected.

11. The electronic device according to claim 9, wherein the actions further comprise:

maintaining the authentication of the first object in response to determining at least one of the following: the distance is greater than the first distance threshold, or the angle is greater than the angle threshold.

12. The electronic device according to claim 9, wherein the determining whether the second object is trustworthy comprises:

determining a biological feature of the second object based on the biological feature signal;

comparing the biological feature with reference biological features in a feature library;

labeling the second object as trustworthy in response to determining that the biological feature is matched with a reference biological feature in a trusted list in the feature library; and labeling the second object as untrustworthy in response to determining that the biological feature is not matched with any reference biological feature in the trusted list in the feature library.

13. The electronic device according to claim 12, wherein the actions further comprise:

establishing the feature library, the feature library comprising biological features of all detected objects; and establishing the trusted list in the feature library, the trusted list comprising objects, among all the objects, whose distances are less than the first distance threshold and angles are less than the angle threshold during the authentication of the first object.

14. The electronic device according to claim 9, wherein the actions further comprise:

detecting the first object using the radar apparatus to obtain a biological feature signal of the first object; and determining a mood state of the first object based on the biological feature signal and with a trained mood prediction model, wherein the mood prediction model is configured to determine, based on a pattern of the biological feature signal, a mood state corresponding to the pattern.

15. The electronic device according to claim 14, wherein the actions further comprise:

determining a mood state of the first object based on the biological feature signal in response to determining that the distance is less than a second distance threshold; and sending an alarm signal in response to the mood state being a nervous state.

16. The electronic device according to claim 9, wherein the biological feature signal comprises at least one of the following items: a heartbeat signal and a respiration signal.

17. A computer program product tangibly stored on a non-transitory computer-readable medium and comprising machine-executable instructions, wherein the machine-executable instructions, when executed by a machine, cause the machine to perform a method comprising:

determining that a first object authenticated by an electronic device is accessing the electronic device;

in response to a second object being detected within a detection range using a radar apparatus of the electronic device, determining, based on a detected signal, that the second object is a person;

determining a distance and an angle between the second object and the electronic device based on an azimuth signal in the detected signal;

in response to determining that the distance is less than a first distance threshold and the angle is less than an angle threshold, determining, based on a biological feature signal in the detected signal, whether the second object is trustworthy; and deauthenticating the first object in response to determining that the second object is untrustworthy.

18. The computer program product according to claim 17, further comprising:

detecting the second object in response to an authentication request from the first object being received; and labeling the second object as trustworthy in response to the second object being detected.

19. The computer program product according to claim 17, further comprising:

maintaining the authentication of the first object in response to determining at least one of the following: the distance is greater than the first distance threshold, or the angle is greater than the angle threshold.

20. The computer program product according to claim 17, wherein the determining whether the second object is trustworthy comprises:

determining a biological feature of the second object based on the biological feature signal;

comparing the biological feature with reference biological features in a feature library;

labeling the second object as trustworthy in response to determining that the biological feature is matched with a reference biological feature in a trusted list in the feature library; and labeling the second object as untrustworthy in response to determining that the biological feature is not matched with any reference biological feature in the trusted list in the feature library.

* * * * *